United States Patent
Wang et al.

(10) Patent No.: US 9,985,683 B2
(45) Date of Patent: May 29, 2018

(54) METHOD AND APPARATUS FOR CANCELING INTERFERENCE

(71) Applicant: HUAWEI TECHNOLOGIES CO., LTD., Shenzhen, Guangdong (CN)

(72) Inventors: Fan Wang, Wuhan (CN); Xiaoshu Si, Wuhan (CN); Tao Ouyang, Wuhan (CN); Xiaolong Zhang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

(21) Appl. No.: 15/618,795

(22) Filed: Jun. 9, 2017

(65) Prior Publication Data

US 2017/0279488 A1 Sep. 28, 2017

Related U.S. Application Data (63) Continuation of application No. PCT/CN2014/093553, filed on Dec. 11, 2014.

(51) Int. Cl.
*H04L 25/03* (2006.01)
*H04B 3/10* (2006.01)

(52) U.S. Cl.
CPC ......... *H04B 3/10* (2013.01); *H04L 25/03885* (2013.01)

(58) Field of Classification Search
CPC ............... H04B 3/10; H04L 25/03885; H04L 25/03057; H04L 2025/03808
See application file for complete search history.

(56) References Cited

U.S. PATENT DOCUMENTS

2004/0244043 A1 12/2004 Lind et al.
2006/0088090 A1* 4/2006 Azenkot ........... H04L 25/03057
375/233

(Continued)

FOREIGN PATENT DOCUMENTS

CN 1830165 9/2006
CN 101088220 12/2007

(Continued)

OTHER PUBLICATIONS

International Search Report dated Aug. 26, 2015 in corresponding International Application No. PCT/CN2014/093553.

(Continued)

*Primary Examiner* — Syed Haider
(74) *Attorney, Agent, or Firm* — Staas & Halsey LLP (57) ABSTRACT

Provided are a method and an apparatus for canceling interference, to resolve a problem that performance of interference cancellation is poor because accuracy of equalizer coefficients obtained by a CMTS through calculation is not sufficiently high. A specific solution is as follows: (101) A CMTS calculates L equalizer coefficients of an L-tap filter according to a preamble sequence by using an adaptive algorithm, and performs adaptive equalization on a received signal by using the L equalizer coefficients, where L is a positive integer greater than 24; and (102) the CMTS selects K equalizer coefficients from the L equalizer coefficients, and sends a ranging response message carrying the K equalizer coefficients to a cable modem CM, so that the CM performs pre-equalization on a to-be-sent signal according to the received K equalizer coefficients, where K is a positive integer less than or equal to L.

8 Claims, 4 Drawing Sheets

(56) References Cited

U.S. PATENT DOCUMENTS

| | | | |
|---|---|---|---|
| 2008/0130733 A1 | 6/2008 | Ogawa et al. | |
| 2012/0196551 A1 | 8/2012 | Gomez et al. | |
| 2014/0036983 A1 | 2/2014 | Ito et al. | |
| 2014/0177620 A1* | 6/2014 | Montreuil | H04L 27/01 370/347 |

FOREIGN PATENT DOCUMENTS

| | | |
|---|---|---|
| CN | 102624655 | 8/2012 |
| JP | 4480765 | 3/2010 |
| WO | 2013/008347 | 1/2013 |

OTHER PUBLICATIONS

Chinese Office Action dated May 11, 2017 in corresponding Chinese Patent Application No. 201480033631.1, 6 pages.

Data Over Cable Service Interface Specifications DOCSIS 3.0, "Physical Layer Specification", CM-SP-PHYv3.0-I11-130808, Aug. 8, 2013, 200 pages.

International Search Report dated Dec. 11, 2014 in corresponding International Patent Application No. PCT/CN2014/093553, 5 pages.

* cited by examiner

FIG. 1

A CMTS calculates L equalizer coefficients of an L-tap filter according to a preamble sequence by using an adaptive algorithm, and performs adaptive equalization on a received signal by using the L equalizer coefficients, where L is a positive integer greater than 24 —101

The CMTS selects K equalizer coefficients from the L equalizer coefficients, and sends a ranging response message carrying the K equalizer coefficients to a cable modem CM, so that the CM performs pre-equalization on a to-be-sent signal according to the received K equalizer coefficients, where K is a positive integer less than or equal to L —102

METHOD AND APPARATUS FOR CANCELING INTERFERENCE

CROSS-REFERENCE TO RELATED APPLICATIONS

This application is a continuation of International Application No. PCT/CN2014/093553, filed on Dec. 11, 2014, the disclosure of which is hereby incorporated by reference in its entirety.

TECHNICAL FIELD

Embodiments of the present invention relate to cable television communications technologies, and in particular, to a method and an apparatus for canceling interference.

BACKGROUND

The Data Over Cable Service Interface Specifications (DOCSIS for short) is an international standard developed by a cable standardization organization (Cable Labs). The DOCSIS 3.0 Physical Layer (PHY for short) Specification defines that when a cable modem (CM for short) transmitter sends an upstream signal to a cable modem termination system (CMTS for short) receiver, pre-equalization processing needs to be performed to cancel interference (including a group delay and a micro-reflection) and increase a modulation error ratio (MER for short) of a constellation of a signal received by a CMTS.

Figure 1:
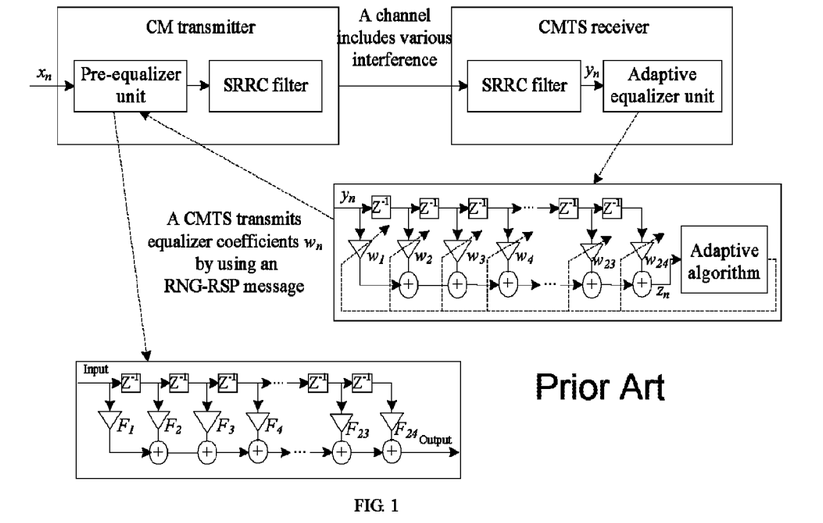
FIG. 1 is a schematic architecture diagram according to the prior art.

In the DOCSIS 3.0 PHY Specification, an adaptive pre-equalization solution used when a CM sends an upstream signal is shown in FIG. 1. The CM includes a square root raised cosine (SRRC for short) filter and a pre-equalizer unit. The pre-equalizer unit uses a transversal filter structure shown in FIG. 1. The CMTS includes an SRRC filter and an adaptive equalizer unit. The adaptive equalizer unit in the CMTS obtains 24 equalizer coefficients (Wn, where n=1, 2, . . . , 24) after performing initial ranging calculation and periodic ranging calculation according to a received known preamble sequence, and then transmits the 24 equalizer coefficients as 24 pre-equalizer coefficients (Fn=Wn, where n=1, 2, . . . , 24) of the pre-equalizer unit to the CM by using a ranging response (RNG-RSP for short) message, so that the coefficients are used to perform pre-equalization on a signal.

To cancel interference, the prior art uses the solution shown in FIG. 1 in which the adaptive equalizer unit of the CMTS calculates 24 equalizer coefficients by using a preamble sequence and transmits the coefficients as 24 pre-equalizer coefficients of the pre-equalizer unit to the CM by using an RNG-RSP message, and then the CM uses the received 24 pre-equalizer coefficients to perform pre-equalization on a signal. In the solution, a main tap location of the 24 pre-equalizer coefficients of the CM is set to 8, so that 8 pre-equalizer coefficients are used to cancel an impact of a group delay, and that remaining 16 pre-equalizer coefficients are used to cancel an impact of micro-reflection. In addition, the adaptive equalizer unit of the CMTS generally calculates the 24 equalizer coefficients by using a fixed step size nested in multiple iterations while using an adaptive algorithm.

The solution in the prior art has the following problem: Because accuracy of the equalizer coefficients obtained by the CMTS through calculation is not sufficiently high, performance of interference cancellation is poor.

SUMMARY

Embodiments of the present invention provide a method and an apparatus for canceling interference, to resolve a problem that performance of interference cancellation is poor because accuracy of equalizer coefficients obtained by a CMTS through calculation is not sufficiently high.

According to a first aspect, an embodiment of the present invention provides a method for canceling interference, where the method includes:

calculating, by a cable modem termination system CMTS, L equalizer coefficients of an L-tap filter according to a preamble sequence by using an adaptive algorithm, and performing adaptive equalization on a received signal by using the L equalizer coefficients, where L is a positive integer greater than 24; and selecting, by the CMTS, K equalizer coefficients from the L equalizer coefficients, and sending a ranging response message carrying the K equalizer coefficients to a cable modem CM, so that the CM performs pre-equalization on a to-be-sent signal according to the received K equalizer coefficients, where K is a positive integer less than or equal to L.

With reference to the first aspect, in a first possible implementation, after the calculating by a CMTS, L equalizer coefficients of an L-tap filter according to a preamble sequence by using an adaptive algorithm, the method further includes:

updating, by the CMTS, the L equalizer coefficients according to the L equalizer coefficients and an iterative algorithm, where a step size used in an iteration N+1 is less than a step size used in an iteration N, and N is a positive integer.

With reference to the first aspect, in a second possible implementation, the adaptive algorithm includes:

a recursive least square (RLS for short) method, a least mean square (LMS for short) algorithm, or a normalized (NLMS for short) algorithm.

With reference to the first possible implementation of the first aspect, in a third possible implementation, the step size used in the iteration N+1 is M times the step size used in the iteration N, N is a positive integer, and 0<M<1.

With reference to the first aspect or any one of the foregoing implementations of the first aspect, in a fourth possible implementation, K is equal to 24.

According to a second aspect, an embodiment of the present invention provides a cable modem termination system, where the cable modem termination system includes:

an adaptive equalizer unit, configured to calculate L equalizer coefficients of an L-tap filter according to a preamble sequence by using an adaptive algorithm, and perform adaptive equalization on a received signal by using the L equalizer coefficients, where L is a positive integer greater than 24; and a sending unit, configured to select K equalizer coefficients from the L equalizer coefficients, and send a ranging response message carrying the K equalizer coefficients to a cable modem CM, so that the CM performs pre-equalization on a to-be-sent signal according to the received K equalizer coefficients, where K is a positive integer less than or equal to L.

With reference to the second aspect, in a first possible implementation, the cable modem termination system further includes:

an iterative updating unit, configured to update the L equalizer coefficients according to the L equalizer coefficients and an iterative algorithm after the L equalizer coefficients of the L-tap filter are calculated according to the preamble sequence by using the adaptive algorithm, where a step size used in an iteration N+1 is less than a step size used in an iteration N, and N is a positive integer.

With reference to the second aspect, in a second possible implementation, the adaptive algorithm includes:

a recursive least square RLS method, a least mean square LMS algorithm, or a normalized NLMS algorithm.

With reference to the first possible implementation of the second aspect, in a third possible implementation, the step size used in the iteration N+1 is M times the step size used in the iteration N, N is a positive integer, and $0<M<1$.

With reference to the second aspect or any one of the foregoing implementations of the second aspect, in a fourth possible implementation, K is equal to 24.

The embodiments of the present invention provide a method and an apparatus for canceling interference. A CMTS calculates L equalizer coefficients of an L-tap filter according to a preamble sequence by using an adaptive algorithm, and performs adaptive equalization on a received signal by using the L equalizer coefficients, where L is a positive integer greater than 24; and the CMTS selects K equalizer coefficients from the L equalizer coefficients, and sends a ranging response message carrying the K equalizer coefficients to a cable modem CM, so that the CM performs pre-equalization on a to-be-sent signal according to the received K equalizer coefficients, where K is a positive integer less than or equal to L. The present invention can resolve a problem that performance of interference cancellation is poor because accuracy of equalizer coefficients obtained by a CMTS through calculation is not sufficiently high.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 2:
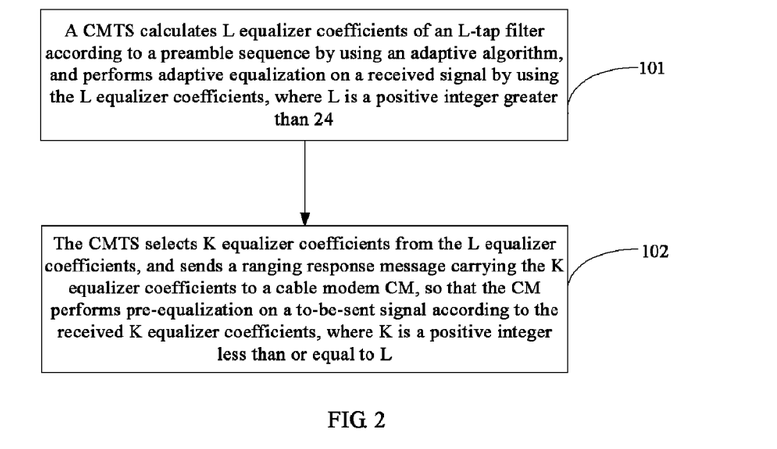
FIG. 2 is a first schematic flowchart of a method for canceling interference according to an embodiment of the present invention.

An embodiment of the present invention provides a method for canceling interference. As shown in FIG. 2, based on a CMTS side, the method includes:

101. A CMTS calculates L equalizer coefficients of an L-tap filter according to a preamble sequence by using an adaptive algorithm, and performs adaptive equalization on a received signal by using the L equalizer coefficients, where L is a positive integer greater than 24.

102. The CMTS selects K equalizer coefficients from the L equalizer coefficients, and sends a ranging response message carrying the K equalizer coefficients to a cable modem CM, so that the CM performs pre-equalization on a to-be-sent signal according to the received K equalizer coefficients, where K is a positive integer less than or equal to L.

This embodiment of the present invention provides a method for canceling interference. A CMTS calculates L equalizer coefficients of an L-tap filter according to a preamble sequence by using an adaptive algorithm, and performs adaptive equalization on a received signal by using the L equalizer coefficients, where L is a positive integer greater than 24; and the CMTS selects K equalizer coefficients from the L equalizer coefficients, and sends a ranging response message carrying the K equalizer coefficients to a cable modem CM, so that the CM performs pre-equalization on a to-be-sent signal according to the received K equalizer coefficients, where K is a positive integer less than or equal to L. The present invention can resolve a problem that performance of interference cancellation is degraded because accuracy of equalizer coefficients obtained by a CMTS through calculation is not sufficiently high.

Figure 7:
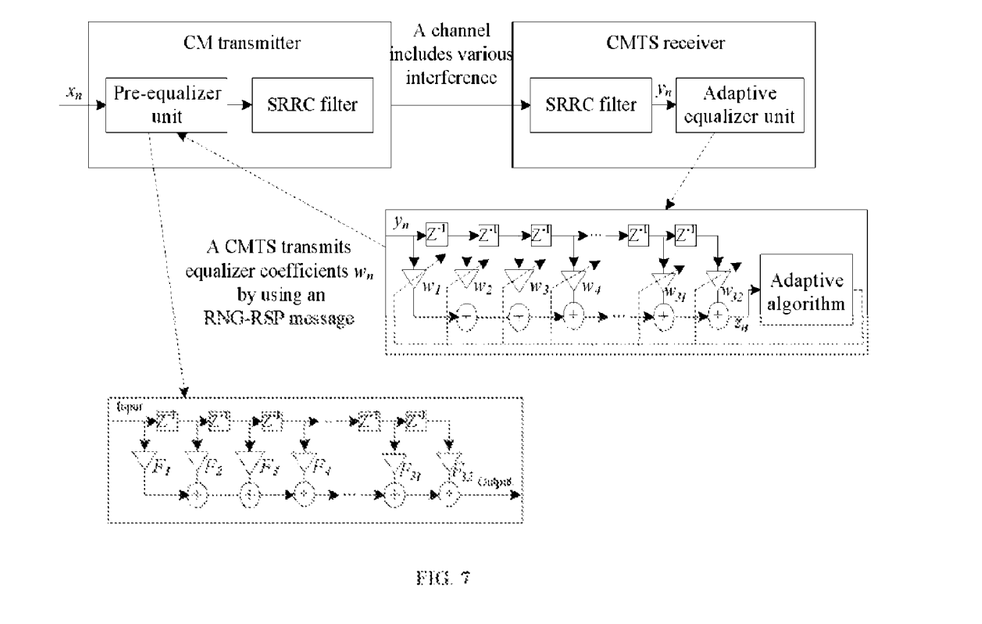
FIG. 7 is a schematic architecture diagram of a 32-tap filter according to an embodiment.

It should be noted that, in the solution of the prior art, a quantity of taps in a filter on a CMTS side is 24, and the CMTS side obtains 24 equalizer coefficients through calculation according to a preamble sequence, the 24-tap filter, and an adaptive algorithm. However, as shown in FIG. 7, in the technical solution provided by the foregoing embodiment of the present invention, because a quantity L of taps in a filter on a CMTS side is greater than 24, for example 32, performance of micro-reflection cancellation may be improved, and L equalizer coefficients obtained by the CMTS side through calculation according to an input and an output of the filter are more accurate. In addition, in the present invention, to adapt to the DOCSIS 3.0 specifications, 24 (K=24) equalizer coefficients are selected from the L equalizer coefficients (first 24 equalizer coefficients may be selected directly, or any 24 equalizer coefficients may be selected, and a selection manner is not limited in the present invention), and carried in an RNG-RSP message and sent to a CM. Therefore, according to the protocol specifications, the CM uses the received 24 equalizer coefficients as 24 pre-equalizer coefficients of a pre-equalizer unit to perform pre-equalization on a signal, where first 8 pre-equalizer coefficients are used to cancel an impact of a group delay, and remaining 16 pre-equalizer coefficients are used to cancel an impact of micro-reflection. In this way, device interworking is not affected, and performance of interference cancellation by the CMTS in upstream reception is improved effectively.

Figure 3:
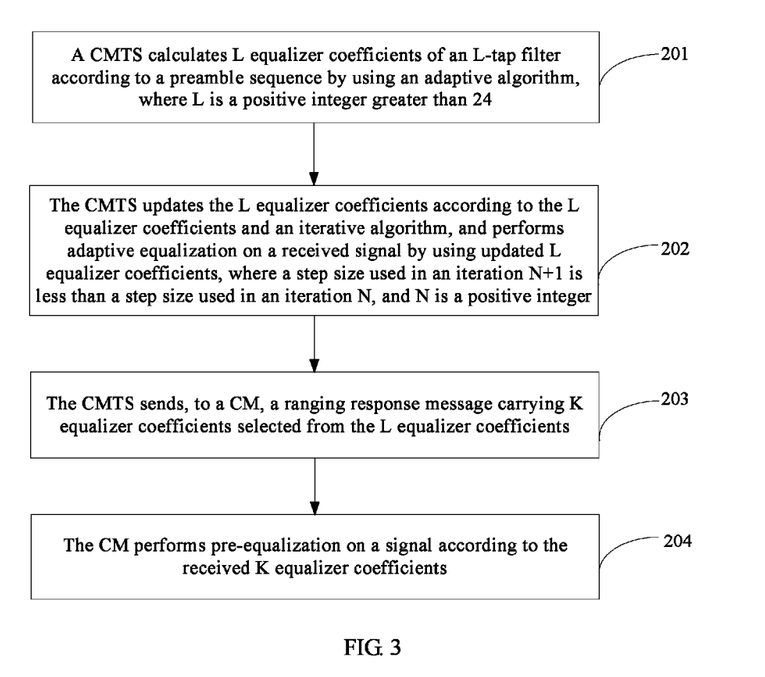
FIG. 3 is a second schematic flowchart of a method for canceling interference according to an embodiment of the present invention.

To enable a person skilled in the art to understand the technical solutions of the embodiments of the present invention more clearly, a method for canceling interference according to an embodiment of the present invention is hereinafter described in detail. As shown in FIG. 3, the method includes:

201. A CMTS calculates L equalizer coefficients of an L-tap filter according to a preamble sequence by using an adaptive algorithm, where L is a positive integer greater than 24.

Specifically, the adaptive algorithm includes a recursive least square RLS method, a least mean square LMS algorithm, or a normalized NLMS algorithm.

For example, assuming that L is set to 32, an adaptive equalizer unit in the CMTS obtains 32 equalizer coefficients after performing initial ranging calculation and periodic ranging calculation according to the preamble sequence by using the LMS algorithm, and the CMTS performs adaptive equalization on a received signal by using the 32 equalizer coefficients.

202. The CMTS updates the L equalizer coefficients according to the L equalizer coefficients and an iterative algorithm, and performs adaptive equalization on a received signal by using updated L equalizer coefficients, where a step size used in an iteration N+1 is less than a step size used in an iteration N, and N is a positive integer.

Specifically, the step size used in the iteration N+1 is M times the step size used in the iteration N, N is a positive integer, and 0<M<1. For example, a step size used in an iteration 2 is 0.25 times a step size used in an iteration 1.

203. The CMTS sends, to a CM, a ranging response message carrying K equalizer coefficients selected from the L equalizer coefficients.

For example, assuming that L is set to 32, to adapt to the DOCSIS 3.0 specifications, K is set to 24, and the CMTS selects first 24 equalizer coefficients from the 32 equalizer coefficients and sends an RNG-RSP message carrying the 24 equalizer coefficients to the cable modem CM.

204. The CM performs pre-equalization on a signal according to the received K equalizer coefficients.

For example, if a pre-equalizer unit on the CM side sets a main tap location of the received 24 pre-equalizer coefficients to 8, first 8 pre-equalizer coefficients are used to cancel an impact of a group delay, and remaining 16 pre-equalizer coefficients are used to cancel an impact of micro-reflection. A person skilled in the art may understand a specific implementation process with reference to the prior art. Details are not described herein.

This embodiment of the present invention provides a method for canceling interference. A CMTS calculates L equalizer coefficients of an L-tap filter (L is greater than 24) according to a preamble sequence by using an adaptive algorithm, then updates the L equalizer coefficients iteratively by using an iterative algorithm, performs adaptive equalization on a received signal by using updated L equalizer coefficients, where a step size in a current iteration is less than a step size in a previous iteration, selects K equalizer coefficients from the iteratively updated L equalizer coefficients, and transmits the K equalizer coefficients to a CM; and the CM performs pre-equalization on a to-be-sent signal according to the received K equalizer coefficients. The present invention can resolve a problem that performance of interference cancellation is poor because accuracy of equalizer coefficients obtained by a CMTS through calculation is not sufficiently high.

To enable a person skilled in the art to see a progress of this embodiment of the present invention in specific implementation over the prior art more intuitively, a device such as a computer is used for emulation and verification. An initial condition is: 25 dB white Gaussian noise is added to a signal, and a group delay and micro-reflection interference are added; initial ranging runs for 100 times; and an iteration quantity m is equal to 3. During emulation, L is set to 24 or 32, and a step size in every iteration is unchanged, or a step size in a current iteration is ¼ of a step size in a previous iteration. An MER of a constellation of a signal received by a CMTS is measured, as shown in the following Table 1.

TABLE 1

| | MER measurement result | | |
|---|---|---|---|
| | | Quantity L of taps of a filter on the CMTS side | |
| MER (dB) | | 24 | 32 |
| Step size in an iteration | The step size in the current iteration is ¼ of the step size in the previous iteration | 24.4536 | 24.6769 |
| | The step size in every iteration is unchanged | 23.1601 | 23.3725 |

As can be seen from Table 1, when L is set to 24 and the step size in every iteration is unchanged, that is, in the solution of the prior art, the MER value is 23.1601 dB. However, in the technical solution provided according to the foregoing embodiment, when L is set to 32 and the step size in every iteration is unchanged, the MER value is 23.3725, approximately 0.21 dB greater than 23.1601, and performance of interference cancellation is increased; when L is set to 32 and the step size in the current iteration is ¼ of the step size in the previous iteration, the MER value is 24.6769, approximately 1.3 dB greater than 23.1601, and interference is canceled more effectively.

In addition, the foregoing initial condition is still used for emulation; a 2 μs micro-reflection signal with −20 dBc (a unit indicating a relative value of power) is added; L is set to 24 or 32; and the step size in the current iteration is ¼ of the step size in the previous iteration. An MER of a constellation of a signal received on the CMTS side is measured, as shown in the following Table 2.

TABLE 2

| | MER measurement result | | |
|---|---|---|---|
| | | Quantity L of taps of a filter on the CMTS side | |
| MER (dB) | | 24 | 32 |
| Step size in an iteration | The step size in the current iteration is ¼ of the step size in the previous iteration | 23.1148 | 24.4285 |

As can be seen from Table 2, although there is a strong far-end micro-reflection, when L is set to 32, the MER value is still increased, approximately 1.3 dB greater than that when L is set to 24, and a strong micro-reflection is canceled more effectively.

It should be noted that, as can also be seen from the foregoing Table 1, when L is set to 24 and the step size in the current iteration is reduced to ¼ of the step size in the previous iteration, the MER value is 24.4536, approximately 1.3 dB greater than the MER value 23.1601 in the solution of the prior art (L is set to 24 and the step size in the iteration is unchanged), and interference is canceled more effectively.

Therefore, the present invention further includes a solution: A 24-tap filter on a CMTS side is used to obtain 24 equalizer coefficients through calculation, then an iterative algorithm is used to update the 24 equalizer coefficients iteratively, and the 24 equalizer coefficients that are updated iteratively are used to perform adaptive equalization on a received signal, where a step size in a current iteration is less than a step size in a previous iteration; and the 24 equalizer coefficients that are updated iteratively are transmitted to a CM and used as 24 pre-equalizer coefficients on the CM side to perform pre-equalization on a signal. The present invention can resolve a problem that performance of interference cancellation is poor because accuracy of equalizer coefficients obtained by a CMTS through calculation is not sufficiently high.

Figure 4:
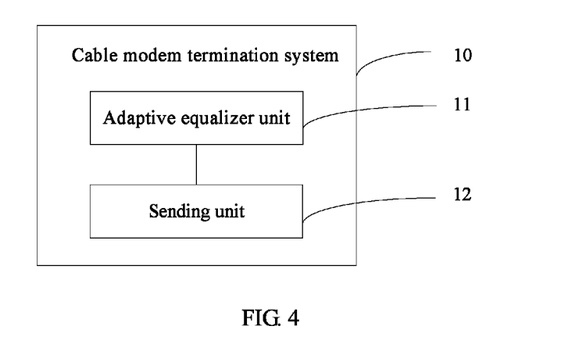
FIG. 4 is a first schematic structural diagram of a cable modem termination system according to an embodiment of the present invention.

An embodiment of the present invention provides a cable modem termination system 10. As shown in FIG. 4, the cable modem termination system 10 includes:

an adaptive equalizer unit 11, configured to calculate L equalizer coefficients of an L-tap filter according to a preamble sequence by using an adaptive algorithm, and perform adaptive equalization on a received signal by using the L equalizer coefficients, where L is a positive integer greater than 24; and a sending unit 12, configured to select K equalizer coefficients from the L equalizer coefficients, and send a ranging response message carrying the K equalizer coefficients to a cable modem CM, so that the CM performs pre-equalization on a to-be-sent signal according to the received K equalizer coefficients, where K is a positive integer less than or equal to L.

Figure 5:
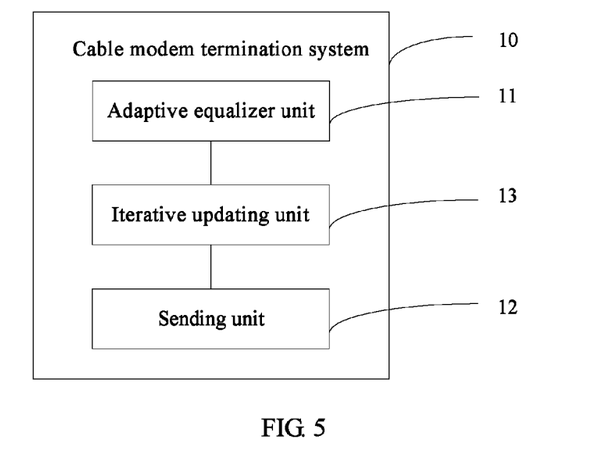
FIG. 5 is a second schematic structural diagram of a cable modem termination system according to an embodiment of the present invention.

Optionally, as shown in FIG. 5, the cable modem termination system 10 further includes:

an iterative updating unit 13, configured to update the L equalizer coefficients according to the L equalizer coefficients and an iterative algorithm after the L equalizer coefficients of the L-tap filter are calculated according to the preamble sequence by using the adaptive algorithm, where a step size used in an iteration N+1 is less than a step size used in an iteration N, and N is a positive integer.

Optionally, the adaptive algorithm includes:

a recursive least square RLS method, a least mean square LMS algorithm, or a normalized NLMS algorithm.

Optionally, the step size used in the iteration N+1 is M times the step size used in the iteration N, N is a positive integer, and 0<M<1.

Optionally, K may be equal to 24.

This embodiment of the present invention provides a cable modem termination system CMTS. The CMTS calculates L equalizer coefficients of an L-tap filter according to a preamble sequence by using an adaptive algorithm, and performs adaptive equalization on a received signal by using the L equalizer coefficients, where L is a positive integer greater than 24; and the CMTS selects K equalizer coefficients from the L equalizer coefficients, and sends a ranging response message carrying the K equalizer coefficients to a cable modem CM, so that the CM performs pre-equalization on a to-be-sent signal according to the received K equalizer coefficients, where K is a positive integer less than or equal to L. The present invention can resolve a problem that performance of interference cancellation is poor because accuracy of equalizer coefficients obtained by a CMTS through calculation is not sufficiently high.

This embodiment is used to implement the foregoing method embodiments. For the working process and operating principle of each unit in this embodiment, reference may be made to the description of the foregoing method embodiments. Details are not described again herein.

Figure 6:
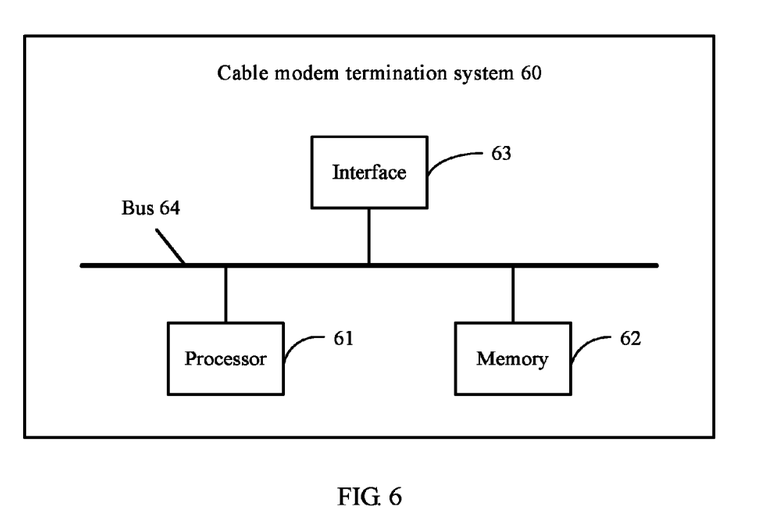
FIG. 6 is a schematic structural diagram of another cable modem termination system according to an embodiment of the present invention.

An embodiment of the present invention provides a cable modem termination system 60. As shown in FIG. 6, the cable modem termination system 60 includes: a bus 64; and a processor 61, a memory 62, and an interface 63 that are connected to the bus 64. The interface 63 is used for communication. The memory 62 is configured to store computer code. The processor 61 is configured to execute the computer code to:

calculate L equalizer coefficients of an L-tap filter according to a preamble sequence by using an adaptive algorithm, and perform adaptive equalization on a received signal by using the L equalizer coefficients, where L is a positive integer greater than 24; and select K equalizer coefficients from the L equalizer coefficients, and send a ranging response message carrying the K equalizer coefficients to a cable modem CM, so that the CM performs pre-equalization on a to-be-sent signal according to the received K equalizer coefficients, where K is a positive integer less than or equal to L.

Optionally, the processor 61 is further configured to execute the computer code to:

update the L equalizer coefficients according to the L equalizer coefficients and an iterative algorithm after the L equalizer coefficients of the L-tap filter are calculated according to the preamble sequence by using the adaptive algorithm, where a step size used in an iteration N+1 is less than a step size used in an iteration N, and N is a positive integer.

Optionally, the adaptive algorithm includes a recursive least square RLS method, a least mean square LMS algorithm, or a normalized NLMS algorithm.

Optionally, the step size used in the iteration N+1 is M times the step size used in the iteration N, N is a positive integer, and 0<M<1.

Optionally, K may be equal to 24.

This embodiment of the present invention provides a cable modem termination system CMTS. The CMTS calculates L equalizer coefficients of an L-tap filter according to a preamble sequence by using an adaptive algorithm, and performs adaptive equalization on a received signal by using the L equalizer coefficients, where L is a positive integer greater than 24; and the CMTS selects K equalizer coefficients from the L equalizer coefficients, and sends a ranging response message carrying the K equalizer coefficients to a cable modem CM, so that the CM performs pre-equalization on a to-be-sent signal according to the received K equalizer coefficients, where K is a positive integer less than or equal to L. The present invention can resolve a problem that performance of interference cancellation is poor because accuracy of equalizer coefficients obtained by a CMTS through calculation is not sufficiently high.

In the several embodiments provided in the present invention, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) or a processor to perform a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein again.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for canceling interference, comprising:
   calculating, by a cable modem termination system (CMTS), L equalizer coefficients of an L-tap filter according to a preamble sequence by using an adaptive algorithm, and performing adaptive equalization on a received signal by using the L equalizer coefficients, wherein L is a positive integer greater than 24;
   updating, by the CMTS, the L equalizer coefficients according to the L equalizer coefficients and an iterative algorithm, wherein a step size used in an iteration N+1 is less than a step size used in an iteration N, and N is a positive integer; and
   selecting, by the CMTS, K equalizer coefficients from the L equalizer coefficients, and sending a ranging response message carrying the K equalizer coefficients to a cable modem (CM), so that the CM performs pre-equalization on a to-be-sent signal according to the received K equalizer coefficients, wherein K is a positive integer less than or equal to L,
   wherein the quantity L of taps in the L-tap filter is 32.

2. The method according to claim 1, wherein the adaptive algorithm comprises:
   a recursive least square RLS method, a least square LMS algorithm, or a normalized least mean square algorithm.

3. The method according to claim 1, wherein the step size used in the iteration N+1 is M times the step size used in the iteration N, N is a positive integer, and 0<M<1.

4. The method according to claim 1, wherein K is equal to 24.

5. A cable modem termination system, comprising:
   a memory; and
   a processor coupled to the memory and configured to:
   calculate L equalizer coefficients of an L-tap filter according to a preamble sequence by using an adaptive algorithm, and perform adaptive equalization on a received signal by using the L equalizer coefficients, wherein L is a positive integer greater than 24;
   update the L equalizer coefficients according to the L equalizer coefficients and an iterative algorithm after the L equalizer coefficients of the L-tap filter are calculated according to the preamble sequence by using the adaptive algorithm, wherein a step size used in an iteration N+1 is less than a step size used in an iteration N, and N is a positive integer; and
   select K equalizer coefficients from the L equalizer coefficients, and send a ranging response message carrying the K equalizer coefficients to a cable modem (CM), so that the CM performs pre-equalization on a to-be-sent signal according to the received K equalizer coefficients, wherein K is a positive integer less than or equal to L,
   wherein the quantity L of taps in the L-tap filter is 32.

6. The cable modem termination system according to claim 5, wherein the adaptive algorithm comprises:
   a recursive least square RLS method, a least mean square LMS algorithm, or a normalized NLMS algorithm.

7. The cable modem termination system according to claim 5, wherein the step size used in the iteration N+1 is M times the step size used in the iteration N, N is a positive integer, and 0<M<1.

8. The cable modem termination system according to claim 5, wherein K is equal to 24.

* * * * *